United States Patent [19]

Yockey et al.

[11] Patent Number: 5,119,762
[45] Date of Patent: Jun. 9, 1992

[54] HYDROSTATIC CURTAIN CONTROL LOCKING SYSTEM

[75] Inventors: Robert E. Yockey, Little Rock; John F. Yockey, Russellville, both of Ark.

[73] Assignee: Bay Ridge Distibuting, Inc., North Little Rock, Ark.

[21] Appl. No.: 779,861

[22] Filed: Oct. 21, 1991

[51] Int. Cl.$^5$ .............................................. A01K 1/00
[52] U.S. Cl. ........................................ 119/21; 119/22
[58] Field of Search ...................... 119/21, 22, 23, 16, 119/15; 254/274, 275

[56] References Cited

U.S. PATENT DOCUMENTS

| | | | |
|---|---|---|---|
| 3,042,001 | 7/1962 | Dubie et al. | 119/21 |
| 3,429,298 | 2/1969 | Thomason | 119/21 |
| 3,474,761 | 10/1969 | Thomason | 119/21 |
| 3,915,377 | 10/1975 | Sutton | 119/21 |
| 3,973,173 | 8/1976 | Smith | 119/21 |
| 4,428,278 | 1/1984 | Sutton | 119/21 |
| 5,031,574 | 7/1991 | McDowell | 119/21 |

Primary Examiner—John G. Weiss
Attorney, Agent, or Firm—Stephen D. Carver

[57] ABSTRACT

A hydrostatic system for controlling ventilation curtains in animal enclosures. A fluid-powered locking system is coupled by hoses to the winch assembly which controls elevation of the ventilation curtains. The locking system comprises a spring-biased piston associated with a rigid cylindrical casing. The casing is sealed by a rigid head and houses a flexible diaphragm which selectively contacts the piston. Fluid pressure is supplied to the casing via hoses coupled to the water line or other fluid source. Fluid entering the casing compresses the diaphragm, which in turn compresses the piston. The rigid piston rod is urged outwardly through the cylinder into frictional engagement with the winch spool. The cylinder at least temporarily locks the spool and thus the curtains at the desired position. A direct current powered solenoid valve maintains pressure to the system. When A.C. power fails, an electronic circuit having a variable timer maintains the system operational for a predetermined, user-selectable period. An alarm is activated to warn of an emergency condition. Thereafter, power to the system is shut off. The solenoid valve reverses, and fluid supplied to the system is vented. As a result, fluid pressure supplied to the piston decreases and the piston retracts out of engagement with the spool. When the spool is released, the ventilation curtains immediately fall, uncovering the windows to increase air circulation through the enclosure.

19 Claims, 4 Drawing Sheets

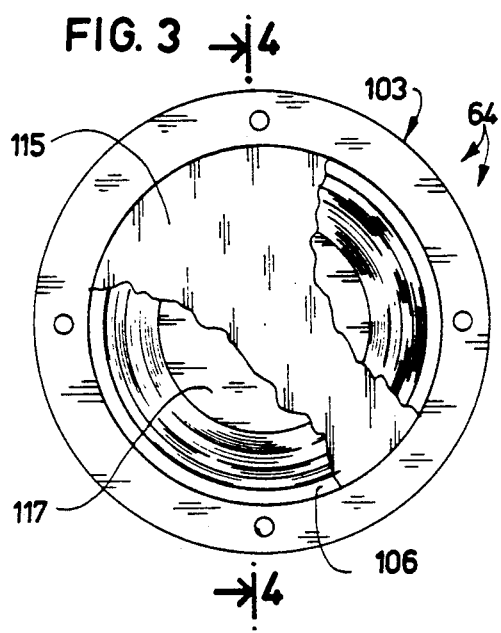
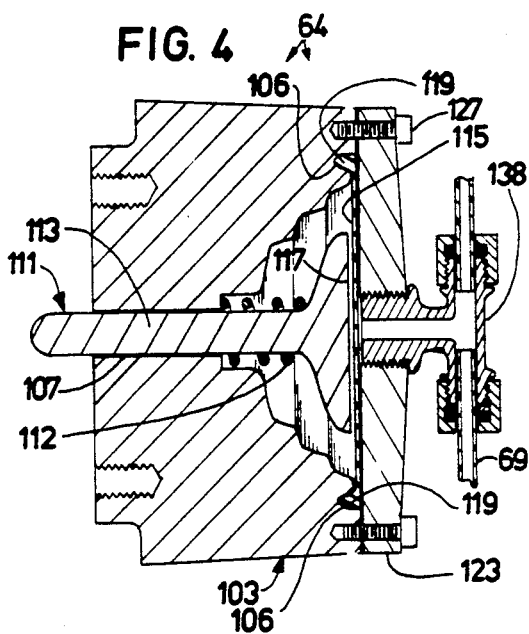
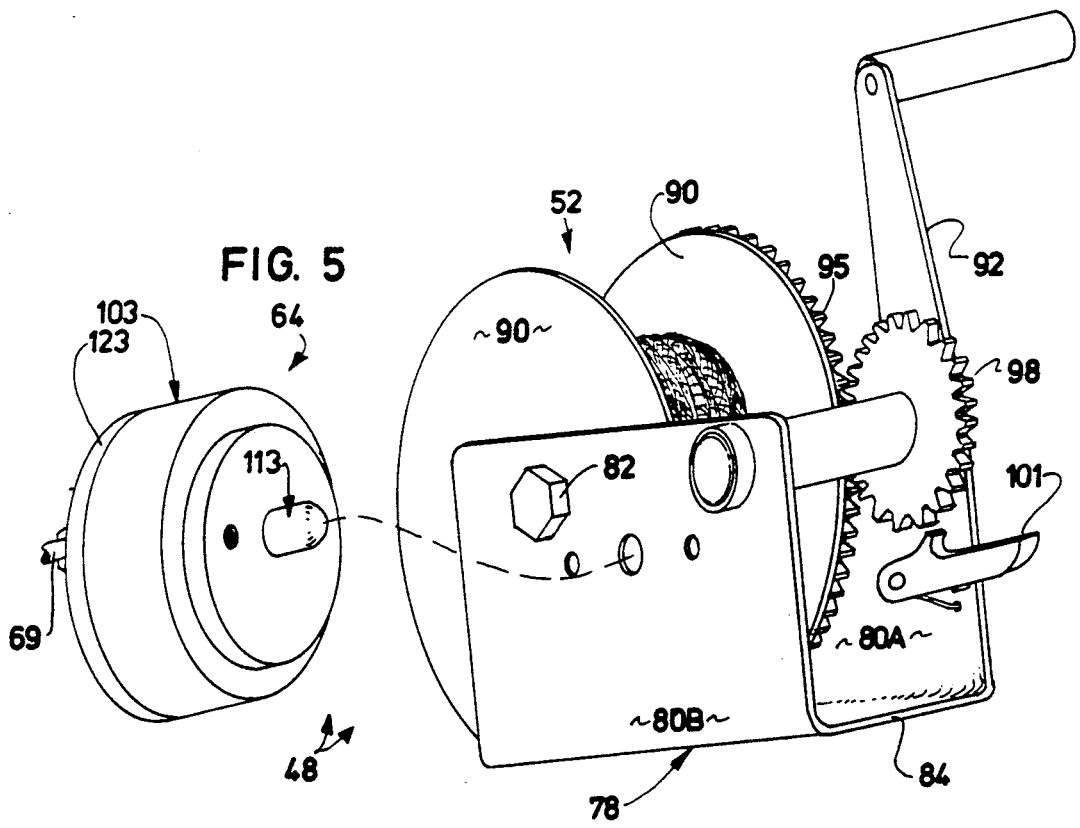

HYDROSTATIC CURTAIN CONTROL LOCKING SYSTEM

BACKGROUND OF THE INVENTION

The present invention relates broadly to systems for controlling ventilation curtains in a livestock enclosure such as a poultry house. More specifically, the present invention relates to a hydrostatically powered system for automatically dropping the curtains open in the event of a power failure or in response to other life-threatening conditions.

As will be appreciated by those familiar with the poultry industry, modern poultry farmers must focus on producing as large a number of marketable chickens in as short a time as possible in order to obtain commercially meaningful returns. Hence, the poultry farmer generally fills each of his poultry houses as close to capacity as possible. For example, a typical poultry house several hundred feet in length commonly houses from 1,500 to 2,000 chickens.

However, dense population in a poultry house may create life-threatening conditions for the fowl. For example, chickens tightly crowded together are extremely vulnerable to suffocation and overheating when air flow in the house is not properly controlled. To encourage healthy air flow, poultry houses are typically provided with large screen windows or wire-covered side walls. Air flow is regulated in part by selectively covering or uncovering the side walls or windows with impermeable curtains. Typically, the curtains are mounted on the house floor or the bottom of the windows. The curtains may be selectively drawn upwardly over the side wall by a conventional system of winch-controlled pulleys. Most houses are also equipped with a forced air ventilation system, typically comprising one or more electric fans.

It will be appreciated that if a power failure disables the electric fans and/or the curtain controls, the temperature inside the house may rapidly rise to a dangerous level. Moreover, air quality can rapidly diminish, as ammonia builds up in the air. Chickens may quickly succumb unless adequate ventilation is immediately supplied. Moreover, if inadequate air is supplied, high levels of carbon dioxide accumulate near the floor, resulting in rapid suffocation of the chickens. Thus, it is critical to the poultry farmer to assure that air flow is properly regulated at all times. Power outage or other failure of air control systems must therefore be immediately detected and corrected to prevent undesired losses to the flock.

In the prior art known to us numerous auxiliary temperature control systems have been proposed for use in poultry houses. More specifically, a wide variety of poultry house curtain control systems are known. For example, U.S. Pat. No. 3,915,377 issued to Sutton on Oct. 28, 1975 discloses a curtain control device for poultry houses. The device comprises a temperature sensor and a sensor for detecting a power failure in combination with an electrically-powered curtain winch system. An auxiliary power system comprising a battery is associated with the winch system. When a power failure is sensed, an alarm sounds, and the control system is automatically switched to battery power. The battery-powered system burns through a cord, which results in release of the winch, so that the curtains freely drop to the floor to provide ventilation.

U.S. Pat. No. 4,428,278 issued Jan. 31, 1984 to Sutton discloses a similar emergency curtain control system wherein a cord is directly interconnected with the winding mechanism of the curtain control. An electromagnetic system is employed to cause the curtain control cord to automatically release when a power outage or other dangerous condition is sensed.

Newell, U.S. Pat. No. 3,802,479, issued Apr. 9, 1974, discloses a system for raising and lowering poultry house curtains. When life-threatening conditions such as the presence of excessive ammonia, changes in relative humidity, and dangerously high temperature are sensed, the window curtains are automatically raised to enhance ventilation. Of lesser relevance is U.S. Pat. No. 3,511,299 issued to Newell on May 12, 1970, which also relates to poultry house curtain control systems. Smith, U.S. Pat. No. 3,973,173 issued Aug. 3, 1976 describes a system for electromagnetically controlling poultry house curtains. Electromagnetic controls release a cord which is mechanically coupled to the handle of the curtain winch, whereby the curtains automatically drop when a power failure is sensed.

Other mechanical means for controlling curtains in livestock enclosures are disclosed in the following U.S. Pat. Nos.: Dubie, 3,042,001, issued Jul. 3, 1962; 3,429,298 issued to Thomason on Feb. 25, 1969; 3,474,761 issued Oct. 28, 1969 to Thomason; 3,571,973 issued to Roberts on Mar. 23, 1971; and, White Patent 3,669,350, issued Jun. 13, 1972. In addition, various prior patents are directed generally to auxiliary control systems, such as Pearson, U.S. Pat. No. 4,129,811 issued Dec. 12, 1978; U.S. Pat. No. 4,602,739, issued Jul. 29, 1986 to Sutton; Siccardi, U.S. Pat. No. 4,369,040, issued Jan. 18, 1983; and, U.S. Pat. No. 4,632,304, issued Dec. 30, 1986 to Newell.

One obvious drawback associated with battery-powered auxiliary systems is that batteries fail if not regularly charged. No electromechanical or electronic control system known to us provides adequate independence from conventional electric power sources. The mechanical release systems known to us typically involve a series of complex couplings, which also require careful maintenance and are therefore relatively vulnerable to failure. The results of failure of the auxiliary ventilating system may be disastrous. Prior art systems also can jam when their actuating strings get tangled. Known prior art units do not allow the curtains and the winch to be adjusted when the system is engaged.

Hence it is desired to provide a highly reliable curtain control system which operates independent of conventional electric sources, and which may be conveniently installed into existing curtain systems.

SUMMARY OF THE INVENTION

Our invention broadly comprises an improved, fluid-powered system for controlling ventilation curtains in an animal enclosure. In common poultry houses, cable-drawn ventilation curtains are associated with open side walls or windows. When it is desired to reduce air circulation in the house, the cables are drawn tight to raise the curtains over the windows and block inflowing air. When tension on the cables is slackened, the curtains fall by their own weight, thereby uncovering the windows.

The ventilation curtains are linked to a winch assembly. The winch assembly comprises a rotatable spool, which is controlled by a fluid-powered locking system associated with an electric control system. The locking system comprises a spring-biased piston displaceable within a tubular casing comprising a central cylinder. The casing is sealed by a rigid head and a internally disposed, flexible diaphragm. Fluid supplied via conventional fittings defined in the head compresses the diaphragm against the piston. The piston protrudes outwardly through the cylinder, and frictionally engages the winch spool, at least temporarily locking it into the selective desired position.

The system is preferably powered by conventional A.C. electricity. When the A.C. source fails, an auxiliary power system is immediately deployed. The auxiliary system comprises a D.C. battery which preferably powers a timer associated with a solenoid valve and an alarm.

When a power failure is sensed, the battery is engaged to activate the timer. Preferably the timer maintains the system operational for an adjustable length of time. For most cases three minutes is optimum. An alarm is activated to warn the caretaker of the emergency condition. After three minutes, power to the system is shut off. The solenoid valve reverses, and fluid supplied to the system is vented. Hence, fluid pressure applied to the piston via the locking cylinder is reduced. The piston is retracted out of engagement with the spool, and the spool is released. Tension on the curtain cables is slackened, and the curtains immediately fall. When the curtains fall, the windows are completely uncovered, and maximum ventilation is delivered into the house.

Thus it is a broad object of the present invention to provide an improved ventilation control system for an animal enclosure.

Another fundamental object of the present invention is to provide a fluid-powered system for locking the ventilation curtains in a selective, desired position.

It is a more specific object of the present invention to provide a water-powered system for selectively locking and unlocking ventilation curtains in an animal enclosure.

An additional object of the present invention is to provide a fluid-powered curtain control system which is powered by an auxiliary source, which is immune to A.C. power failures.

A further object of the present invention is to provide a hydrostatic curtain control system which provides visual and audible alarms to warn the user of the existence of an emergency condition, such as a power failure.

A specific object of the present invention is to provide a poultry house curtain control system which is coupled to existing water lines.

Yet another specific object of the present invention is to provide a poultry house curtain control system which employs a winch coupled to a fluid-powered locking system.

Still another object of the present invention is to provide a poultry house curtain control system which may be selectively coupled to any fluid source, including a conventional water line, an air or gas tank, or an hydraulic fluid supply.

Another object is to provide a curtain control system of the character described which exhibits superior holding power.

Another object is to provide the grower with a visual warning when water pressure fails.

A still further object is to provide a system enabling the winch handle to be disposed in any convenient position. It is a feature of our invention that locking occurs independently of the winch handle position, so the curtains can be precisely adjusted, as the handle position can be fine tuned.

Another important object is to provide an adjustable time delay circuit, since the curtains should be released faster in the summer months than during winter.

Yet another object is to employ hydrostatic pressure against the winch rather than using electricity for the generation of restraining force, to make the system safer.

Another object is to provide a system of the character described which allows the deployment of any number of curtain control winches.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a greatly enlarged, top plan view of the preferred locking cylinder with the head removed, portions of which have been broken away for brevity and clarity;

FIG. 4 is a fragmentary, sectional view taken generally along line 4—4 of FIG. 3;

FIG. 5 is a fragmentary, partially exploded, perspective view of the preferred winch assembly;

DETAILED DESCRIPTION

Figure 1:
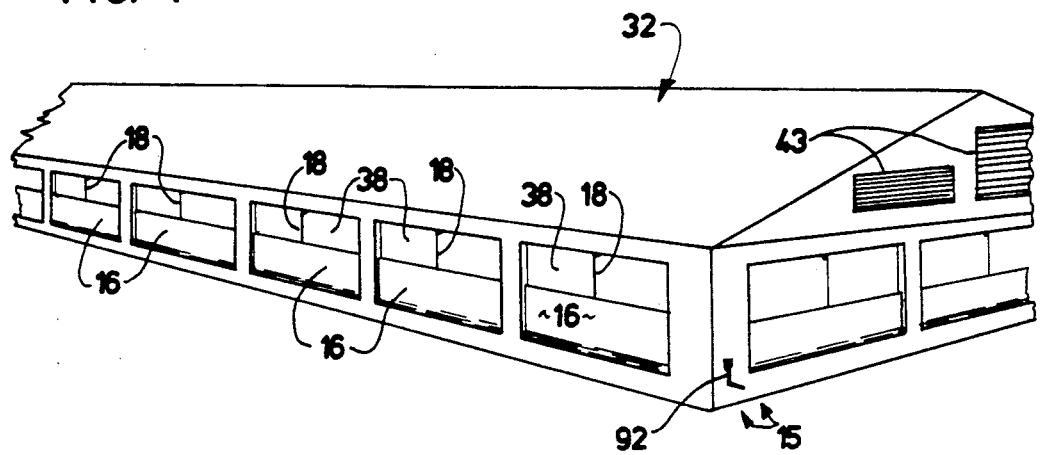
FIG. 1 is a fragmentary, pictorial view illustrating our new Hydrostatic Curtain Control Locking System in use on a typical poultry house.

With reference to the accompanying drawings, our new system for controlling ventilation curtains in a livestock enclosure is broadly designated by the reference numeral 15. System 15 is preferably linked to an existing curtain system, typically comprising a plurality of curtains 16 suspended by pulley-driven cables 18.

Figure 2:
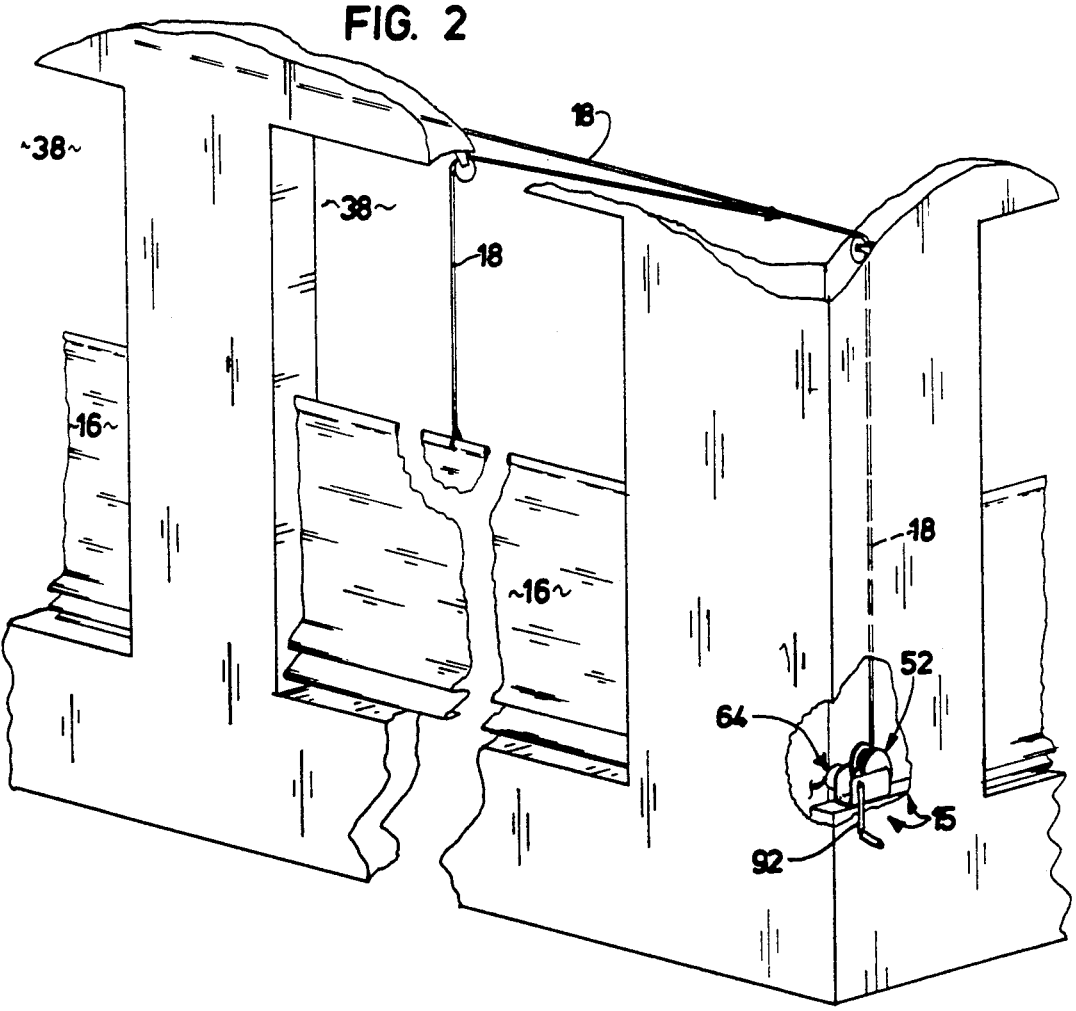
FIG. 2 is an enlarged scale, fragmentary, pictorial view of our system coupled to a ventilation curtain.

In a typical poultry house 32 such as is shown in FIGS. 1 and 2, one curtain 16 is associated with each of the large side windows 38. The curtains 16 may be selectively raised or lowered to reduce or increase air flow through the house 32. Typically, a forced air ventilation system comprising electric fans 43 or the like is also employed. Raising the curtains 16 reduces air flow to maintain the interior temperature. Alternatively, when the curtains 16 are dropped, the windows 38 are uncovered so that air flow through the poultry house 32 is maximized.

Figure 6:
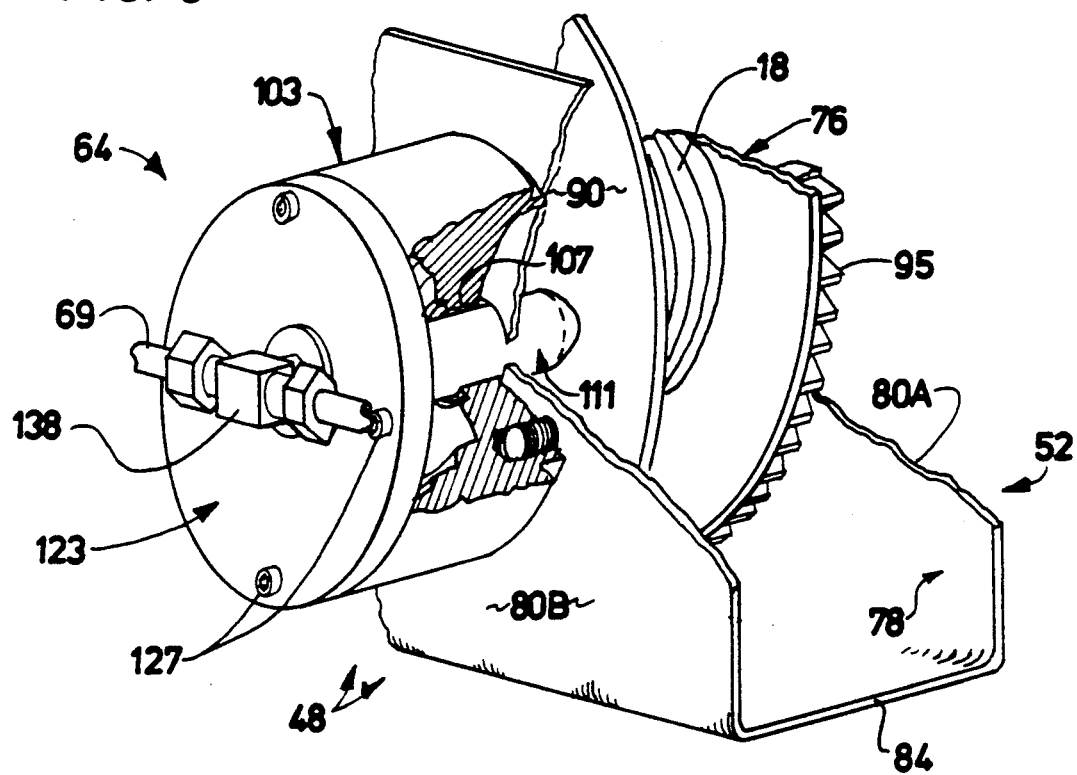
FIG. 6 is a fragmentary perspective view of the winch assembly, portions of which have been removed or are shown in section for brevity and clarity; and, FIG. 7 is an electrical schematic diagram of the preferred circuitry thereof.
Figure 7:
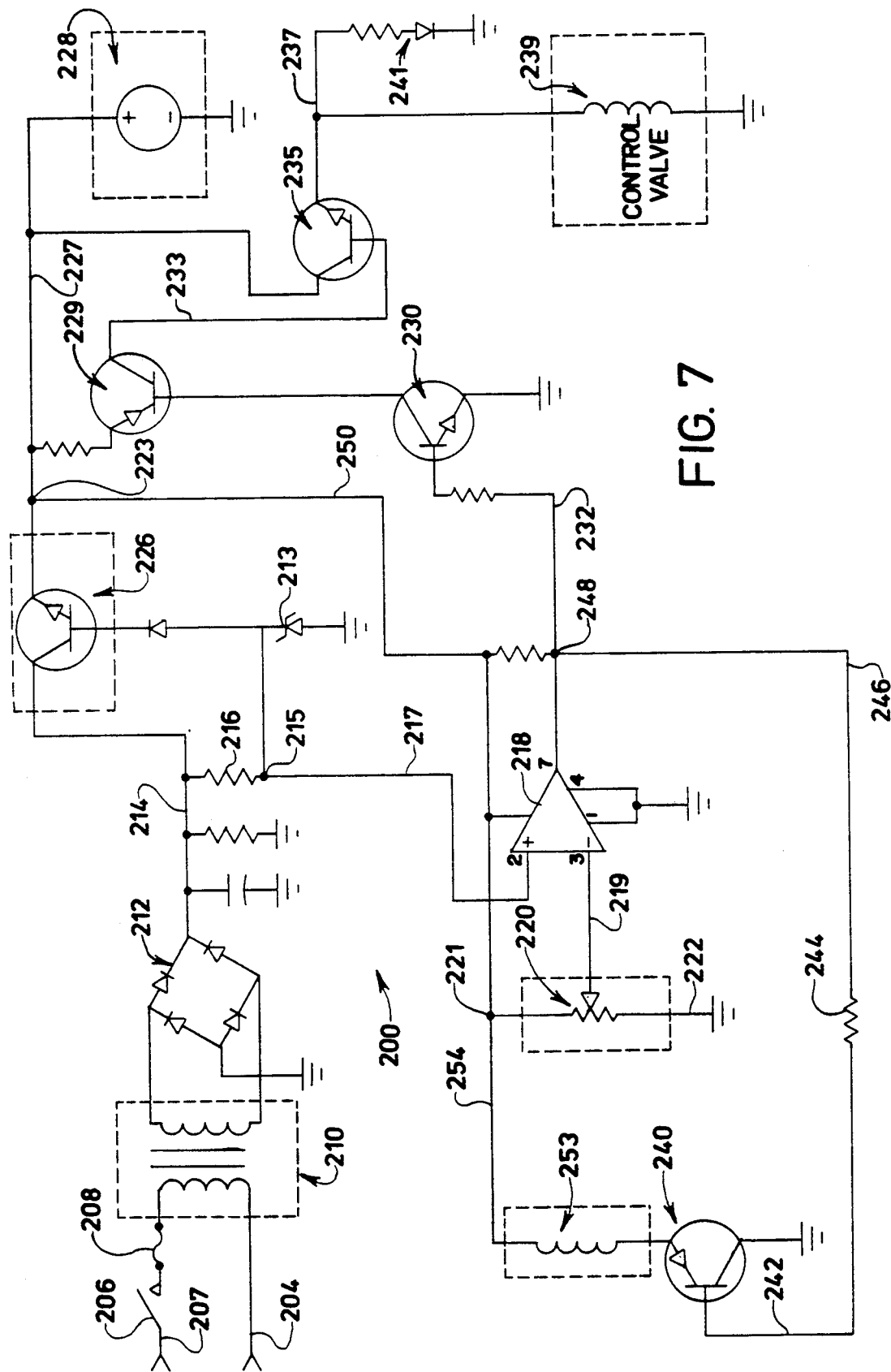

As best viewed in FIGS. 5 and 6, curtains 16 may be simultaneously raised or lowered by activation of a drive system broadly designated by the reference numeral 48. Drive system 48 comprises a winch assembly 52 controlled by a fluid-powered locking assembly, broadly designated by the reference numeral 64. Preferably locking assembly 64 is coupled to an external fluid source via suitable hoses 69. Locking assembly 64 is also coupled to an electric control system, broadly designated by the reference numeral 200 (FIG. 7).

Winch assembly 52 comprises a spool 76 which is journalled for rotation within a rigid bracket 78 by bolt 82. Bracket 78 comprises a mounting face 84 and a pair of integral, outwardly projecting sides 80A, 80B. Spool 76 comprises a pair of rigid end plates 90. A handcrank 92 facilitates selective manual rotation of the spool, which permits the user to position the curtains at the desired height.

Rotation of the spool is controlled by a spur gear 95 coupled to end plate 90. Gear 95 interlocks with a cooperating pinion 98 associated with handcrank 92. Where desired, a mechanical brake 101 may also be engaged to prevent undesired reversal. Once the curtains are set at the desired height, spool 76 is frictionally retained by locking assembly 64. The locking assembly 64 is coupled to bracket side 80B opposite handcrank 92.

With reference directed to FIGS. 3-6, locking assembly 64 preferably comprises a generally tubular casing 103 having a central cylinder 107. Piston 111 is slidably disposed within cylinder 107, and it is biased by spring 112. Piston 111 comprises an integral, rigid rod 113 which projects through casing 103.

The interior of casing 103 also defines a peripheral well 106 (FIG. 3). A flexible diaphragm 115 preferably constructed of rubber or other water-impermeable material comprises a peripheral rim 119 which rests within peripheral well 106 of the casing. Diaphragm 115 rests upon the top 117 of piston 111 and seals cylinder 107. A rigid head 123 secured by a plurality of bolts 127 seals the outer end of casing 103, and its interior surface contacts diaphragm 115.

Head 123 defines an inlet orifice which threadably mounts a fluid fitting such as a zirc fitting 138. Fitting 138 is coupled to an external fluid source by hose 69 as best viewed in FIG. 6. In the best mode, the fluid source is a water line. However, it will be appreciated that other fluids could be advantageously applied, including oils, hydraulic fluid, and air or other gasses.

Fluid pressure applied via fitting 138 compresses the flexible diaphragm 115, which in turn tensions the piston 111. When pressure is thus applied, piston 111 drives rod 113 through cylinder 107 toward the spool 76. Rod 113 frictionally engages spool 76 to lock the spool against rotation. As long as fluid pressure is applied against piston 111, spool 76 will retain the curtain 16 in the selected closed position. If the system should lose incoming A.C. power, battery power is activated.

With additional reference now directed to FIG. 7, the preferred electronic timer control circuit 200 controls and times the apparatus. As indicated, system 200 is normally powered by A.C. electricity. However, when electric power is not supplied, such as in the event of a power failure or the like, an auxiliary battery power source is deployed. In the best mode, the auxiliary source 228 (FIG. 7) comprises a 12-volt D.C. battery. When A.C. power loss is first sensed, auxiliary battery 228 continues to power the timer circuit 200, which delays deployment of the curtains for a user selected time interval. Based on our experimentation, the timer is most advantageously set for shorter durations in the summer, and longer durations in the winter months, depending upon outside temperature. A three-minute interval is an optimum starting point. Shorter intervals are less desirable, since brief periods of power outage such as are commonly experienced on residential and rural lines are generally not deleterious.

After the selected time interval expires, the timer circuit 200 withdraws battery power from the solenoid field 239. When its D.C. power is interrupted, the valve automatically reverses and vents fluid from the system via hoses 69. Water pressure is thus reduced against diaphragm 115. When no water pressure is applied to the piston 111, tension is released. Spring 112 urges piston 111 backward through cylinder 107. Thus, piston rod 113 disengages from frictional contact with the spool 76. When spool 76 is thus released, the tension on cables 18 slacks and the ventilation curtains 16 fall under their own weight to an open position. The windows are uncovered, and maximum ventilation through the house 32 is promptly achieved.

Circuit 200 (FIG. 7) is adapted to be interconnected with a source of 120 volt A.C. power across lines 204 and 207 through a switch 206 and a line fuse 208. Transformer 210 outputs A.C. to a full wave diode rectifier 212 to provide direct current along line 214, leading to the collector of transistor 226. Voltage applied through resistor 216 to node 215 is regulated by Zener diode 213. Line 217 applies regulated D.C. voltage to an input of operational amplifier 218, as long as A.C. appears across input lines 204, 207. A second input to amplifier 218 appears on line 219 from the center of potentiometer 220 which has one end connected to node 221 and its opposite end grounded at 222. Depending upon the position of potentiometer 220 the timing constant of amplifier 218 is changed.

When lines 207 and 204 are "hot," transistor 226 is "on," and D.C. voltage is transmitted to node 223 and line 227. Line 227 charges the battery 228. Line 232 activates transistor 230, which in turn activates transistor 229, thereafter firing transistor 235. Node 248 is held high by amplifier 218 as long as A.C. power is available. When this occurs an output current on line 233 is transmitted to the base of transistor 235 causing voltage to be applied to line 237. This actuates the field winding 239 of the solenoid control valve to apply holding pressure; when transistor 235 goes "off" field 239 is eventually deenergized, water is vented to release pressure, and the winch is released. A visual "power on" indication is provided through LED 241.

When A.C. power failure occurs node 215 drops to zero volts, and transistor 226 goes off. Transistor 240 will be biased "on" by the battery 228 via lines 250, 246 and 242 and resistor 244, connected by line 242 to the base of transistor 240. Transistor 240 is normal held "off" by transistor 229. When transistor 240 is "on" it will actuate the audio alarm 253 connected between the emitter of transistor 240, line 254, and node 221. It will continue to activate amplifier 218 via potentiometer 220 for a preselected interval, and transistor 235 will maintain field current with battery power for a delay. When amplifier 218 times out (depending upon the setting of potentiometer 220) node 248 drops in voltage, and transistor 230 goes off. This immediately turns off transistor 235, which then stops applying battery power to field 239.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A system for controlling the ventilation curtains in a livestock enclosure such as a poultry house, said system comprising:

winch means for selectively opening and closing said curtains;

fluid operated means for selectively locking said winch means to at least temporarily retain said curtains in a closed position; and, control means for selectively activating said fluid operated means, said control means comprising valve means for normally outputting fluid pressure as long as normal AC electricity is supplied to said enclosure and for releasing fluid pressure a predetermined time interval after failure of A.C. power; whereby said winch means is released in the event of a power failure and said curtains are automatically opened.

2. The system as defined in claim 1 including electronic circuit means for activating said control means, said circuit means comprising means for varying the release time of said control means and battery means for temporarily powering said control means during said predetermined time interval independently of said A.C. power.

3. The system as defined in claim 2 including pressure responsive alarm means for signaling the opening of said curtains.

4. The system as defined in claim 1 wherein said winch means comprises:

housing means for mounting the winch means interiorly of said livestock enclosure;

spool means rotatably coupled to said housing means for receiving and selectively winding cable means extending to said curtains, said spool means comprising a pair of spaced apart end plates;

crank means for rotating said spool means; and, means for mounting said fluid operated means to said housing means.

5. The system as defined in claim 4 wherein said fluid operated means comprises:

a rigid casing comprising an interior cylinder;

a piston slidably displaceable within said cylinder;

a head disposed over said cylinder;

yieldable diaphragm means disposed between said piston and said head for sealing said cylinder;

a fluid receptive chamber defined between said diaphragm and said head;

a rod controlled by said piston and projecting outwardly of said housing for selectively contacting said spool means; and, means for admitting pressurized fluid into said chamber.

6. The system as defined in claim 5 including battery means for powering said control means during said predetermined time interval independently of said A.C. power.

7. The system as defined in claim 6 including pressure responsive alarm means for signaling the opening of said curtains.

8. The system as defined in claim 7 including electronic circuit means for activating said control means, said circuit means comprising means for varying the release time of said control means and battery means for temporarily powering said control means during said predetermined time interval independently of said A.C. power.

9. The system as defined in claim 8 including pressure responsive alarm means for signaling the opening of said curtains.

10. A fluid operated system for controlling the ventilation curtains in livestock enclosures having winch means for selectively opening and closing the curtains, said system comprising:

fluid operated means for selectively locking said winch means to at least temporarily retain said curtains in a closed position; and, control means for selectively activating said fluid operated means, said control means comprising valve means for normally outputting fluid pressure as long as normal AC electricity is supplied to said enclosure and for releasing fluid pressure a predetermined time interval after failure of A.C. power; whereby said winch means is released in the event of a power failure and said curtains are automatically opened.

11. The system as defined in claim 10 further comprising electronic circuit means for activating said control means, said circuit means having means for varying the release time of said control means.

12. The system as defined in claim 11 wherein said fluid operated means comprises:

a rigid casing comprising an interior cylinder;

a piston slidably displaceable within said cylinder;

a head disposed over said cylinder;

yieldable diaphragm means disposed between said piston and said head for sealing said cylinder;

a fluid receptive chamber defined between said diaphragm and said head;

a rod controlled by said piston and projecting outwardly of said housing for selectively contacting said winch; and, means for admitting pressurized fluid into said chamber.

13. The system as defined in claim 12 including battery means for powering said circuit means during said predetermined time interval independently of said A.C. power.

14. The system as defined in claim 13 including pressure responsive alarm means for signaling the opening of said curtains.

15. A hydrostatic, variable time system for controlling the ventilation curtains in a livestock enclosure such as a poultry house, said system comprising:

winch means for selectively opening and closing said curtains;

hydrostatic means for selectively locking said winch means to at least temporarily retain said curtains in a closed position; and, control means for selectively activating said hydrostatic means, said control means comprising valve means for normally outputting fluid pressure as long as normal AC electricity is supplied to said enclosure and for releasing fluid pressure a predetermined time interval after failure of A.C. power;

electronic circuit means for activating said control means, said circuit means having means for varying the release time of said control means; and, whereby said winch means is released a preselected time interval after a power failure and said curtains are automatically opened.

16. The system as defined in claim 15 wherein said circuit means comprises battery means for powering said control means during said predetermined time interval independently of said A.C. power.

17. The system as defined in claim 16 including pressure responsive alarm means for signaling the opening of said curtains.

18. The system as defined in claim 17 wherein said winch means comprises:
   housing means for mounting the winch means interiorly of said livestock enclosure;
   spool means rotatably coupled to said housing means for receiving and selectively winding cable means extending to said curtains, said spool means comprising a pair of spaced apart end plates;
   crank means for rotating said spool means; and,
   means for mounting said fluid operated means to said housing means.

19. The system as defined in claim 18 wherein said fluid operated means comprises:
   a rigid casing comprising an interior cylinder;
   a piston slidably displaceable within said cylinder; a head disposed over said cylinder;
   yieldable diaphragm means disposed between said piston and said head for sealing said cylinder;
   a fluid receptive chamber defined between said diaphragm and said head;
   a rod controlled by said piston and projecting outwardly of said housing for selectively contacting said spool means; and,
   means for admitting pressurized fluid into said chamber.

* * * * *